June 24, 1969 — I. L. COOK ET AL — 3,451,392
NOSE FILTER
Filed Feb. 24, 1966
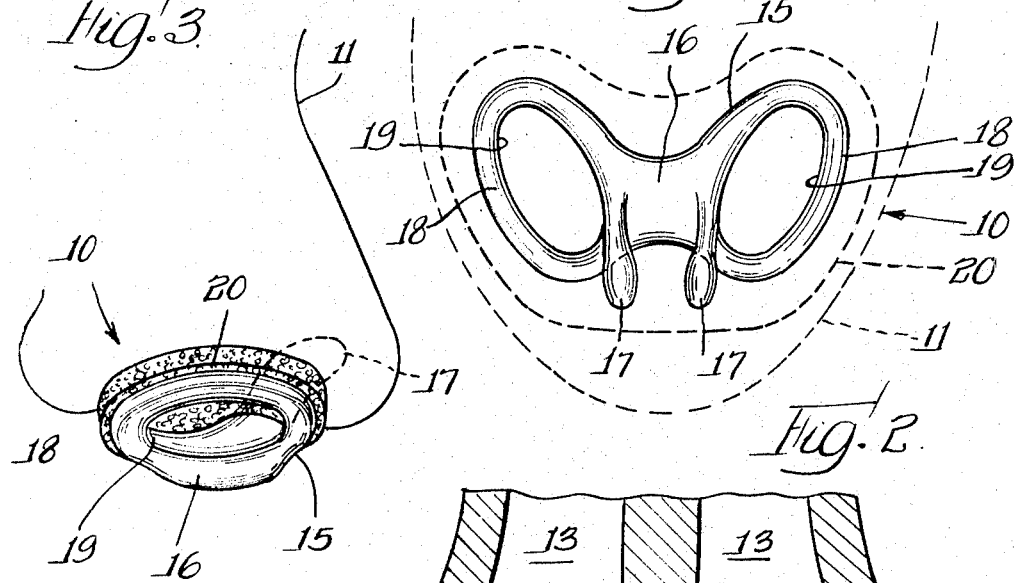
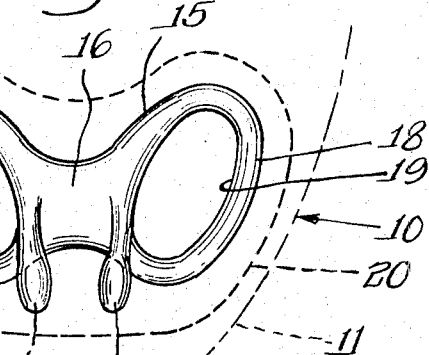
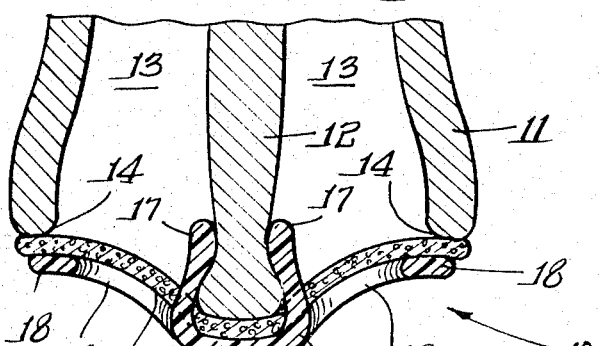
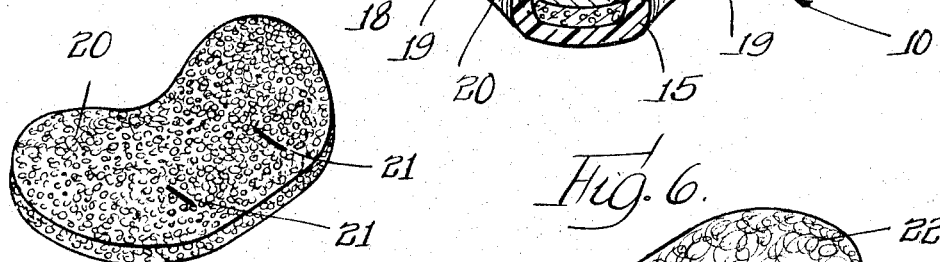
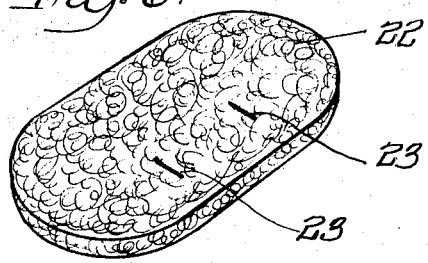
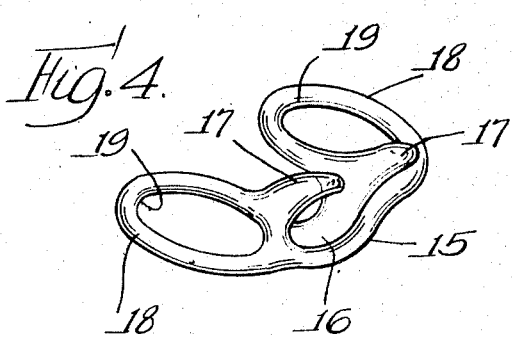
Inventors
Irving I. Cook
Douglas I. Cook

United States Patent Office 3,451,392
Patented June 24, 1969

3,451,392
NOSE FILTER
Irving L. Cook and Douglas L. Cook,
both of Suring, Wis. 54174
Filed Feb. 24, 1966, Ser. No. 529,725
Int. Cl. A61f 1/18, 13/00
U.S. Cl. 128—140                                           6 Claims

ABSTRACT OF THE DISCLOSURE

A nose filter for filtering air breathed or inhaled through the nose includes a molded single piece holder having a base portion, a pair of gripper portions integral with the base portion which are anatomically contoured to frictionally and anatomically engage the septum of the nose, and a pair of wing portions integral with the base portion adapted to underlie the nostrils of the nose, the wing portions having apertures therein. A layer of filtering material overlies the upper side of the base and wing portions for filtering the air breathed or inhaled by the nose through the apertures in the wing portions.

---

The principal object of this invention is to provide an improved nose filter for filtering air breathed or inhaled through the nose which includes a single piece holder for holding a filtering material over the nostrils of the nose, and wherein the filtering material may be readily and removably applied to and held on the holder, wherein the holder may be readily and removably applied to the nose for holding the filtering material over the nostrils, wherein the holder is light in weight, simple in construction and fool proof in operation, and wherein the holder may be inexpensively manufactured.

While the nose filter of this invention has a wide variety of applications of use, it is particularly useful in the field of dentistry or the like for protecting dentists and their assistants and patients from microorganisms or pathogens in the patient's oral flora, particularly where ultra-high speed or turbine drills are being utilized which tend to form an aerosol or mist containing such microorganisms or pathogens and which would be inhaled by the dentists and their assistants and patients. Such inhalation is effectively prevented by the nose filter of this invention which may be readily and comfortably used for this purpose.

Further objects of this invention reside in the construction of the nose filter and in the cooperative relationships between the component parts or portions thereof.

Other objects and advantages of this invention will become apparent to those skilled in the art upon reference to the accompanying specification, claims and drawing in which:

FIG. 1 is a top plan view of the single piece holder of the nose filter of this invention and illustrating the layer of filtering material and a nose in broken lines;

FIG. 2 is a vertical sectional view through the nose filter of this invention and showing the same applied to a nose;

FIG. 3 is a side elevational view of the nose filter of this invention looking from the left of FIGS. 1 and 2;

FIG. 4 is a perspective view of the single piece holder of the nose filter of this invention;

FIG. 5 is a perspective view illustrating one form of filtering material which may be utilized in the nose filter; and FIG. 6 is a perspective view of another form of filtering material which may be utilized in the nose filter.

The nose filter of this invention is generally designated at 10 and is shown in FIGS. 1, 2 and 3 as being applied to the underside of a nose 11 having a septum or dividing wall or partition 12 for defining a pair of cavities or passages or nasal fossae 13 which open to the exterior of the nose by the nostrils or anterior nares 14, the septum or dividing wall or partition 12 having sulci or furrows. The nostrils 14 and cavities or passages 13 form the respiratory passages for breathing and inhaling.

The nose filter 10 of this invention includes a single piece holder 15 which may be formed of a suitable synthetic plastic material comprising a suitable resin or mixture of resins capable of being formed into the holder. Exemplary of such materials are polymethylmethacrylate, polystyrene, nylon and the like and copolymers thereof. Alternatively the holder may be made of a suitable metal which may be formed into the holder, as for example, metals which may be die cast such as aluminum, magnesium and the like and combinations or alloys thereof.

The single piece holder 15 includes a base portion 16 which is adapted to underlie the septum 12 of the nose. A pair of spaced apart gripper portions 17 which are integral with the base portion 16 extend upwardly from the base portion and are adapted to be received in the nostrils 14 of the nose and to frictionally and anatomically engage opposite sides of the septum 12 in the cavities 13 for releasably securing the holder 15 beneath the nose 11. In addition to extending upwardly, the pair of gripper portions 17 also preferably extend forwardly so as to engage and grip the fleshy and cartilaginous portion of the septum 12. In this respect, the gripper portions 17 are anatomically contoured, that is inwardly and inwardly convexly contoured as shown more particularly in FIG. 2, to the sulci of the septum 12, which are characteristic of all septums in human noses, for anatomical retention of the holder 15 beneath the nose. The single piece holder 15 is preferably made in large, medium and small sizes having different spacing between the gripper portions 17 to accommodate variations in septum width of noses which vary a couple of millimeters in each case of large, medium and small noses.

A pair of wing portions 18 which are integral with the base portion 16 extend substantially laterally from the base portion 16 and are adapted to underlie the nostrils 14 of the nose 11. These wing portions 18 are provided with apertures 19 therein which are in alignment with the nostrils 14 of the nose. The wing portions 18 with their apertures 19 are shaped to follow the normal contour of the nose 11 around the nostrils 14.

A layer of filtering material, such as the layer 20 illustrated in FIG. 5, overlies the upper side of the base portion 16 and the wing portions 18 of the holder 15 and the layer may be slitted as indicated at 21 in FIG. 5 to receive the gripper portions 17 of the holder. The gripper portions 17 extending through the layer of filtering material 20 operate to hold the layer of filtering material 20 in place on the holder. The layer of filtering material overlies the openings 19 in the wing portions 18 as illustrated in FIG. 2 and operates to filter the air being breathed or inhaled. As illustrated in FIG. 2, the layer of filtering material may comprise an elastomeric foam which may be a thermo plastic foam, as for example, a polyethylene foam, or a thermosetting foam, as for example, a polyurethane foam, or the like. The elastomeric foam is soft and follows the contours of the nose so as to effectively filter the air being breathed or inhaled, the foam having tortuous passages for the air and permitting breathing or inhalation of the air while at the same time filtering out harmful microorganisms or pathogens or the like.

Another form of the layer of filtering material is shown at 22 in FIG. 6 and as expressed above, this layer may also be slitted as indicated at 23 for the reception of the gripper portions 17 of the holder 15. Here, the layer of filtering material 22 may comprise a mat of fibrous material having overlapping fibers which may be natural fibers or synthetic fibers. As one example, the fibrous mat may utilize a cellulosic fiber such as cotton or the like. The layer of filtering material 22 operates to permit breathing and inhalation and at the same time filters out the harmful microorganisms or pathogens as expressed above in connection with the layer 20 of filtering material.

From the foregoing it is seen that the layer of filtering material 20, 22 may be readily applied to and removed from the single piece holder 15 and is firmly held in place on the holder 15 by the gripper portions 17. Also the holder 15 with its layer of filtering material 20, 22 may be readily applied to and removed from the nose as desired.

While for purposes of illustration one form of this invention has been disclosed, other forms thereof may become apparent to those skilled in the art upon reference to this disclosure and, therefore, this invention is to be limited only by the scope of the appended claims.

We claim:

1. A nose filter for filtering air breathed or inhaled through the nose comprising a molded single piece holder including a base portion adapted to underlie the septum of the nose, a pair of spaced apart gripper portions integral with the base portion and extending upwardly from the base portion and adapted to be received in the nostrils of the nose and inwardly and inwardly convexly contoured to fricitonally and anatomically engage opposite sides of the septum of the nose for releasably and anatomically securing the holder beneath the nose, and a pair of wing portions integral with the base portion and extending laterally from the base portion and adapted to underlie the nostrils of the nose and having apertures therein in alignment with the nostrils of the nose, and a layer of filtering material overlying the upper side of said base portion and wing portions of said holder and held in place on said holder by said gripper portions of said holder extending therethrough, said layer of filtering material being held in place over the nostrils of the nose when said holder is releasably and anatomically secured beneath the nose by said gripper portions thereof for filtering air breathed or inhaled by the nose through the apertures in the wing portions.

2. A nose filter as defined in claim 1 wherein said single piece holder comprises a synthetic plastic member.

3. A nose filter as defined in claim 1 wherein said single piece holder comprises a metallic member.

4. A nose filter as defined in claim 1 wherein said gripper portions extending upwardly from the base portion of the single piece holder also extend forwardly therefrom.

5. A nose filter as defined in claim 1 wherein said layer of filtering material comprises an elastomeric foam.

6. A nose filter as defined in claim 1 wherein said layer of fitlering material comprises a fibrous mat.

References Cited

UNITED STATES PATENTS

| 1,221,778 | 4/1917 | Wadhams | 128—140 |
| 2,660,166 | 11/1953 | Coleman | 128—140 |
| 3,101,709 | 8/1963 | Gruenewaelder | 128—146.2 |

FOREIGN PATENTS

| 13,937 | 1913 | Great Britain. |
| 490,828 | 2/1954 | Italy. |
| 137,501 | 10/1952 | Sweden. |

WILLIAM E. KAMM, *Primary Examiner.*